Figure 1:
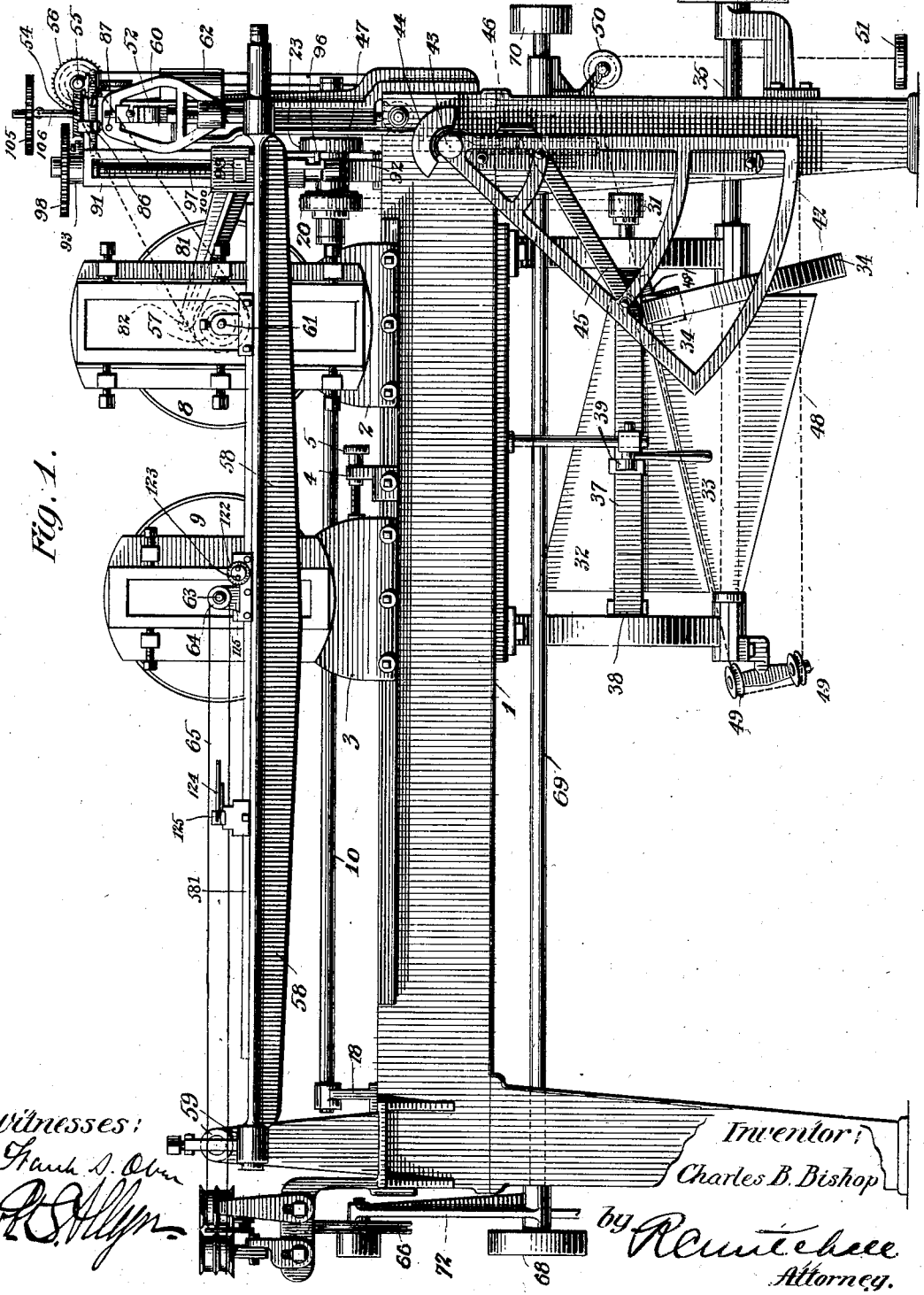

No. 709,863. Patented Sept. 30, 1902.
C. B. BISHOP.
ENGRAVING MACHINE.
(Application filed Nov. 7, 1901.)
(No Model.) 14 Sheets—Sheet 3.

Witnesses:

Inventor:
Charles B. Bishop,
by
Attorney.

No. 709,863. Patented Sept. 30, 1902.
C. B. BISHOP.
ENGRAVING MACHINE.
(Application filed Nov. 7, 1901.)

(No Model.) 14 Sheets—Sheet 4.

Witnesses:

Inventor:
Charles B. Bishop,
by
Attorney.

No. 709,863. Patented Sept. 30, 1902.
C. B. BISHOP.
ENGRAVING MACHINE.
(Application filed Nov. 7, 1901.)
(No Model.) 14 Sheets—Sheet 5.
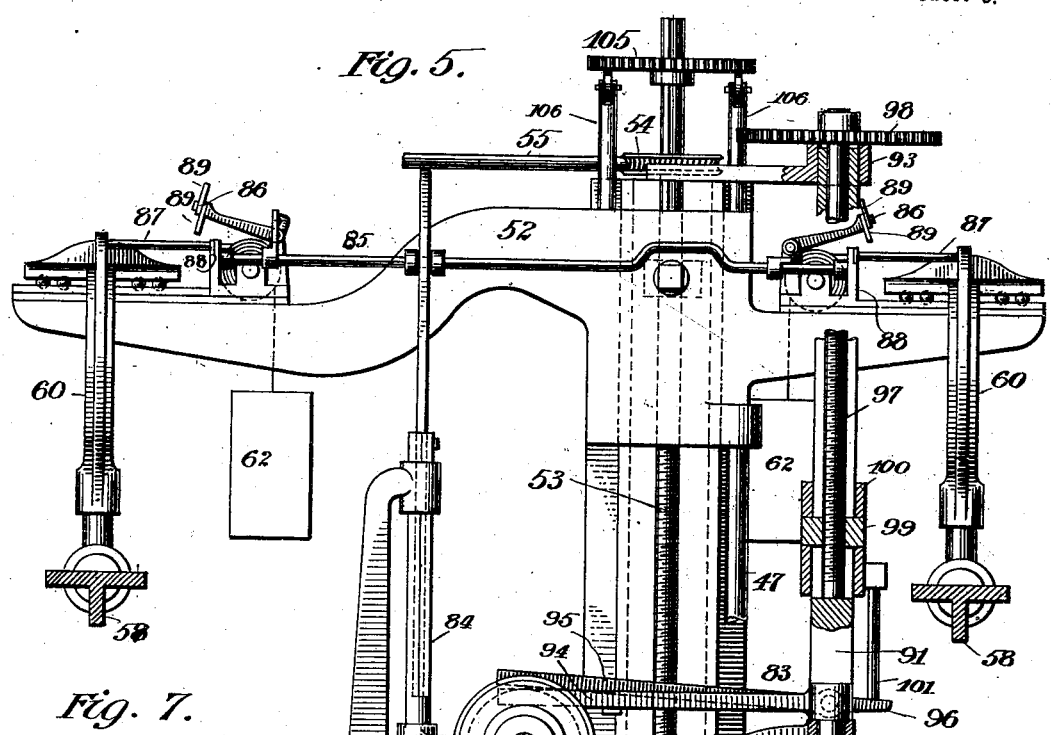
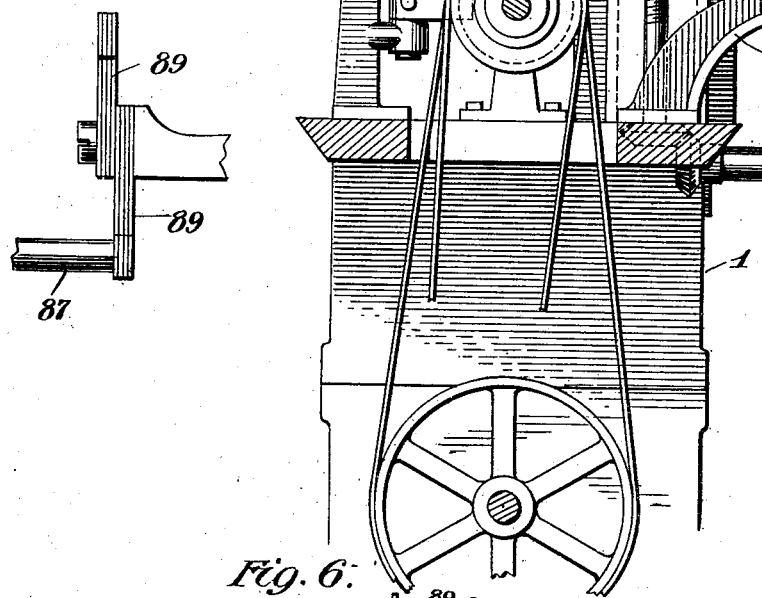
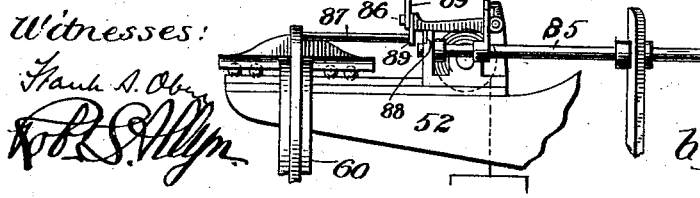
Witnesses:
Frank A. Oby
Rob S. Allyn
Inventor:
Charles B. Bishop,
by R Critchlee
Attorney.
THE NORRIS PETERS CO., PHOTO-LITHO., WASHINGTON, D. C.

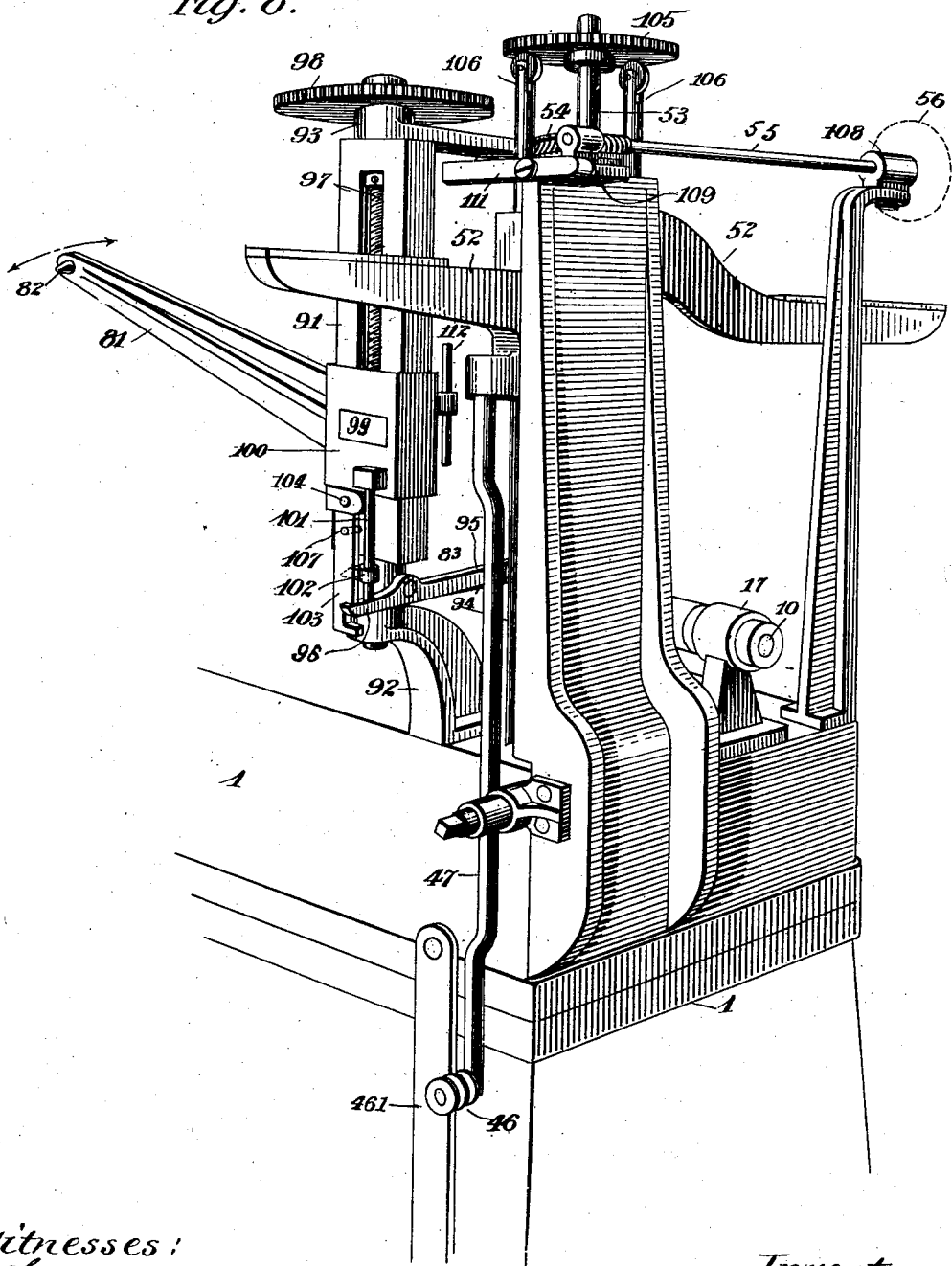

No. 709,863. Patented Sept. 30, 1902.
C. B. BISHOP.
ENGRAVING MACHINE.
(Application filed Nov. 7, 1901.)

(No Model.) 14 Sheets—Sheet 7.

Witnesses:
Frank A. O...
D. S. Allyn

Inventor:
Charles B. Bishop,
by R. Cutchee
Attorney.

THE NORRIS PETERS CO., PHOTO-LITHO., WASHINGTON, D. C.

No. 709,863. Patented Sept. 30, 1902.
C. B. BISHOP.
ENGRAVING MACHINE.
(Application filed Nov. 7, 1901.)
(No Model.) 14 Sheets—Sheet 8.

Witnesses:
Inventor:
Charles B. Bishop,
by _____ Attorney.

No. 709,863. Patented Sept. 30, 1902.
C. B. BISHOP.
ENGRAVING MACHINE.
(Application filed Nov. 7, 1901.)
(No Model.) 14 Sheets—Sheet 9.
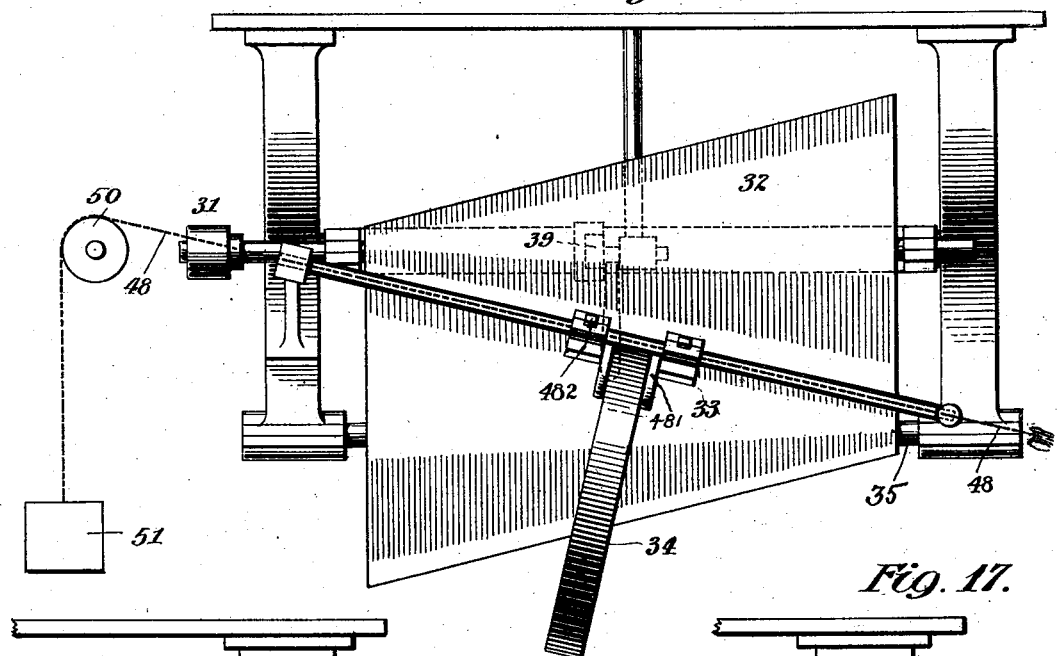
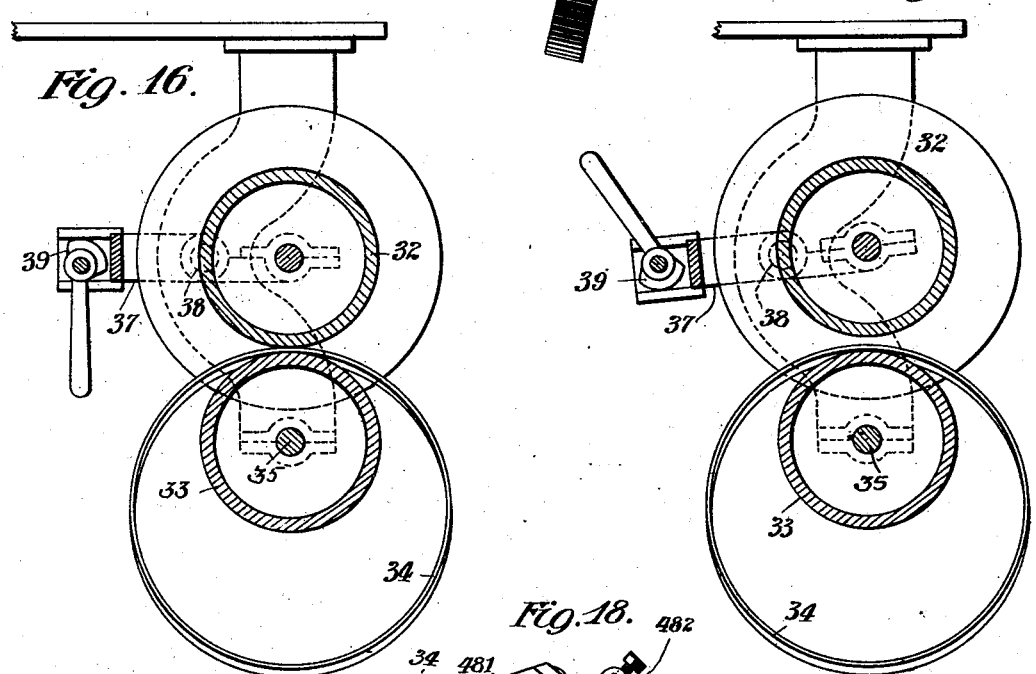
Witnesses:
Frank S. Ober
Rob. S. Allyn
Inventor:
Charles B. Bishop,
by R. Cutechee
Attorney.

No. 709,863. Patented Sept. 30, 1902.
C. B. BISHOP.
ENGRAVING MACHINE.
(Application filed Nov. 7, 1901.)

(No Model.) 14 Sheets—Sheet 10.

Witnesses:
Frank J. Ob—
Robt. S. Allyn

Inventor
Charles B. Bishop,
by R. C. Mitchell
Attorney

No. 709,863. Patented Sept. 30, 1902.
C. B. BISHOP.
ENGRAVING MACHINE.
(Application filed Nov. 7, 1901.)
(No Model.) 14 Sheets—Sheet 11.

Witnesses:

Inventor:
Charles B. Bishop,
by R. Cunechee,
Attorney.

No. 709,863. Patented Sept. 30, 1902.
C. B. BISHOP.
ENGRAVING MACHINE.
(Application filed Nov. 7, 1901.)
(No Model.) 14 Sheets—Sheet 12.
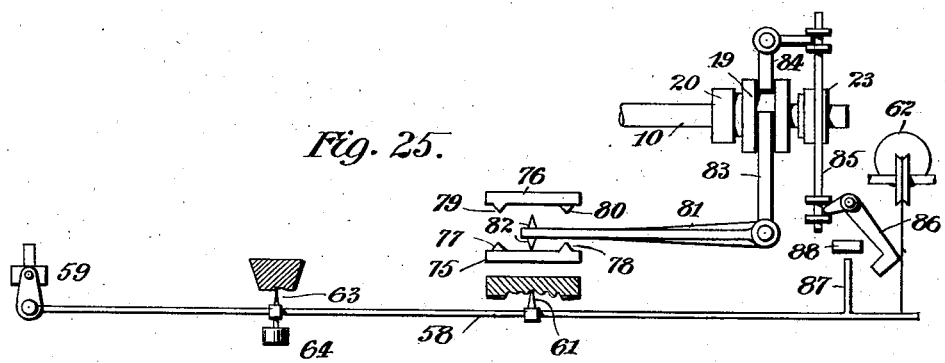
*Fig. 25.*
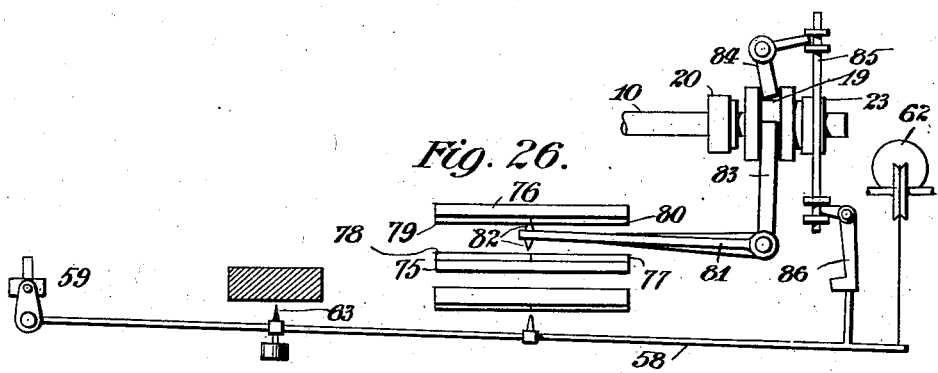
*Fig. 26.*
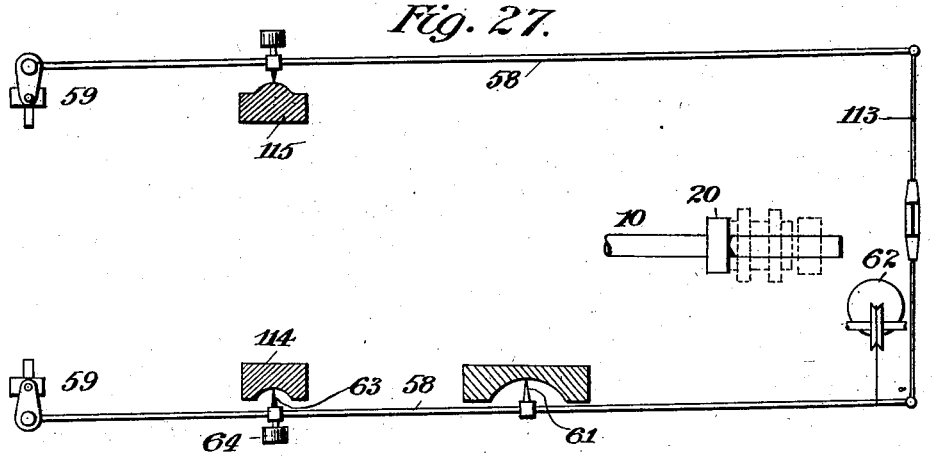
*Fig. 27.*
*Fig. 28.*
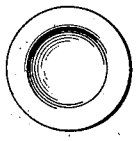
Witnesses:
Frank S. Ober
Rob S. Allyn
Inventor:
Charles B. Bishop
by R. Cutcheon
Attorney.
THE NORRIS PETERS CO., PHOTO-LITHO., WASHINGTON, D. C.

No. 709,863. Patented Sept. 30, 1902.
C. B. BISHOP.
ENGRAVING MACHINE.
(Application filed Nov. 7, 1901.)
(No Model.) 14 Sheets—Sheet 13.
Fig. 29.
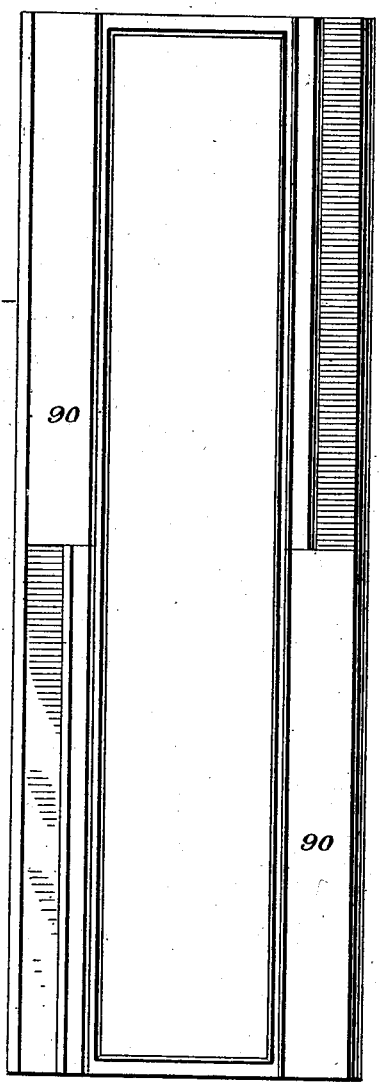
Fig. 30.
Fig. 32.
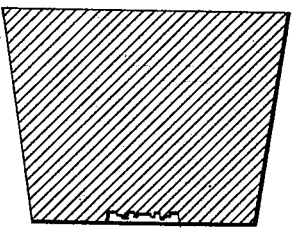
Fig. 31.
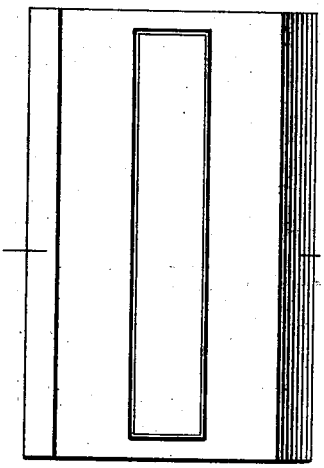
Witnesses:
Frank S. Ober
Rob S. Allyn
Inventor:
Charles B. Bishop,
by R. C. Mitchell
Attorney.
THE NORRIS PETERS CO., PHOTO-LITHO., WASHINGTON, D. C.

No. 709,863. Patented Sept. 30, 1902.
C. B. BISHOP.
ENGRAVING MACHINE.
(Application filed Nov. 7, 1901.)

(No Model.) 14 Sheets—Sheet 14.

Witnesses Inventor:
Charles B. Bishop,
By his Attorney

UNITED STATES PATENT OFFICE.

CHARLES B. BISHOP, OF NEW BRITAIN, CONNECTICUT, ASSIGNOR TO P. & F. CORBIN, OF NEW BRITAIN, CONNECTICUT, A CORPORATION OF CONNECTICUT.

ENGRAVING-MACHINE.

SPECIFICATION forming part of Letters Patent No. 709,863, dated September 30, 1902.

Application filed November 7, 1901. Serial No. 81,461. (No model.)

*To all whom it may concern:*

Be it known that I, CHARLES B. BISHOP, a citizen of the United States, residing at New Britain, county of Hartford, State of Connecticut, have invented certain new and useful Improvements in Engraving-Machines, of which the following is a full, clear, and exact description.

My invention relates to automatic machinery, and particularly to machines for producing dies, forces, and other irregular bodies.

The purpose of my invention is to produce a machine which will be automatic in character, effective, durable, and comparatively simple in construction and operation. Incidental to the construction of the machine it will be seen to involve certain fundamental features covering mechanism essential to the expeditious production of a superior product.

The accompanying drawings illustrate the preferred embodiment of the machine; but it is obvious that the same may be modified in a great variety of ways in regard to many of the features thereof without departing from the spirit or scope of my invention.

Figure 2:
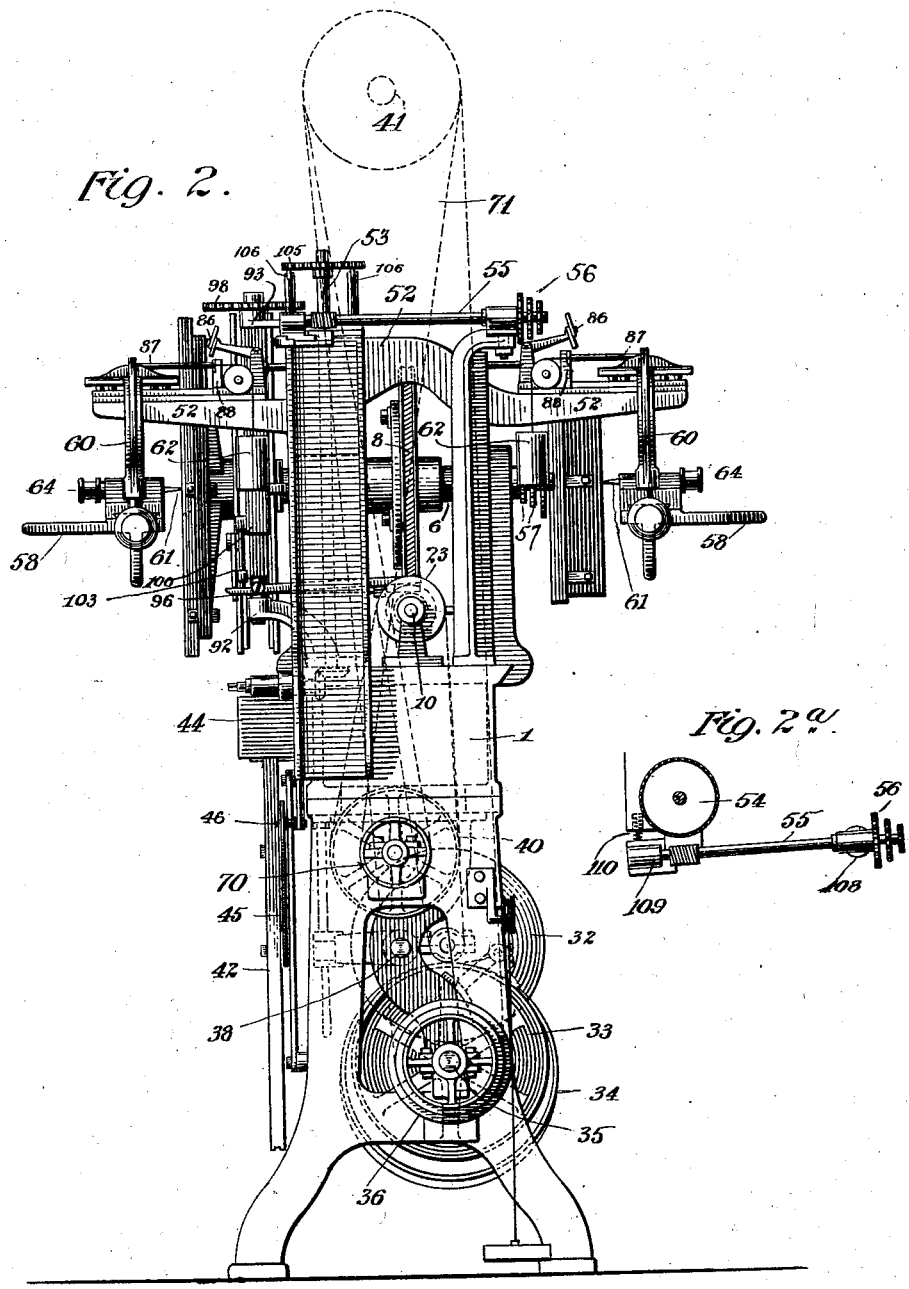
Figure 3:
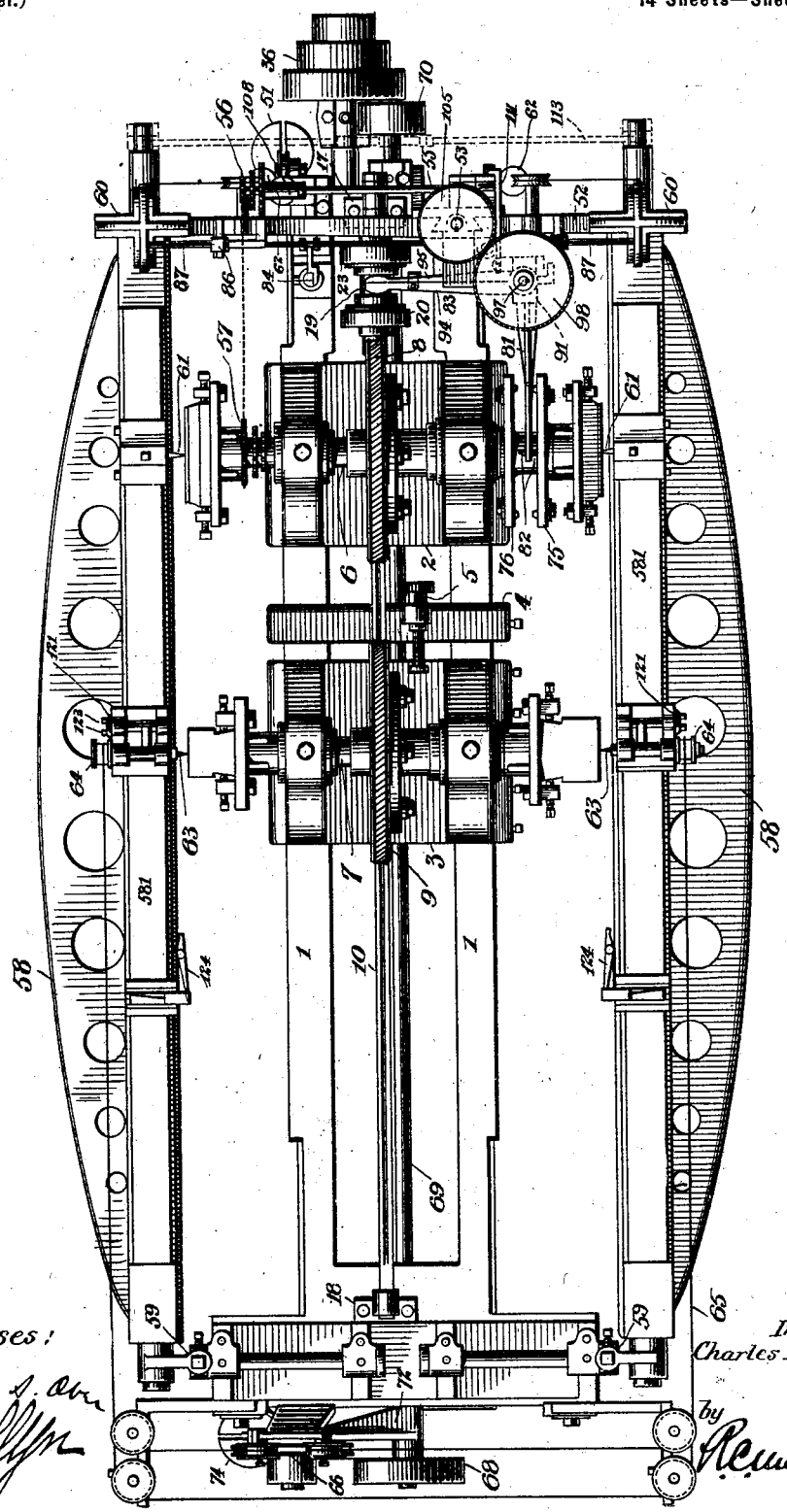
Figure 4:
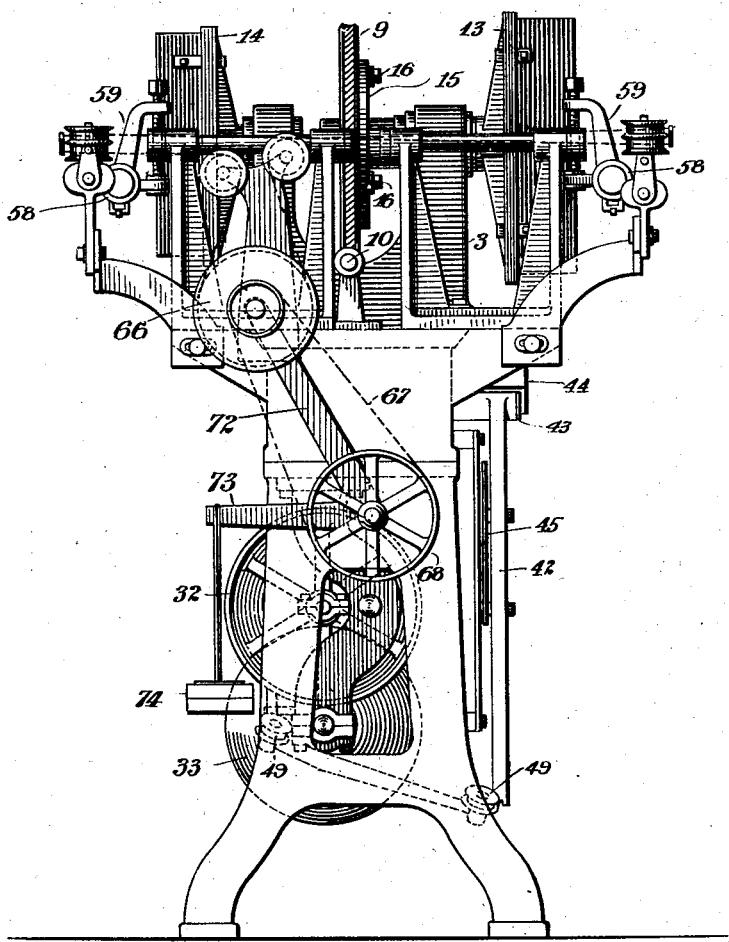
Figure 13:
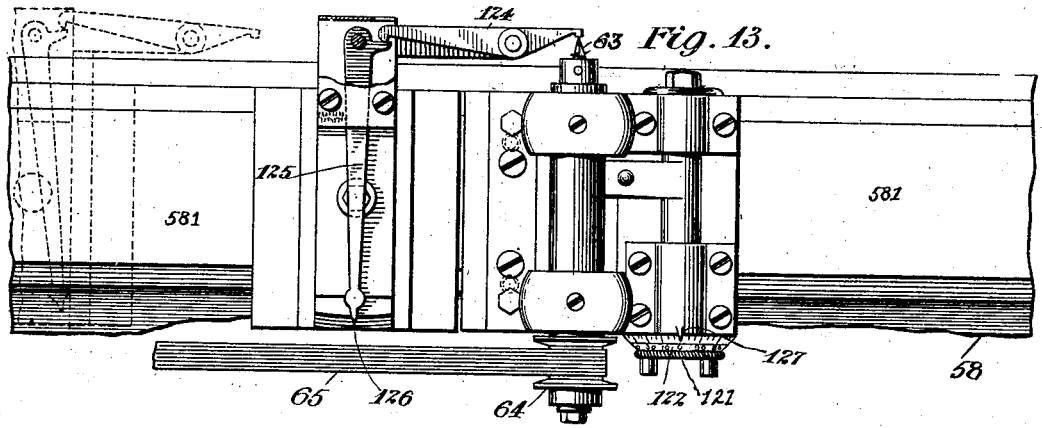
Figure 14:
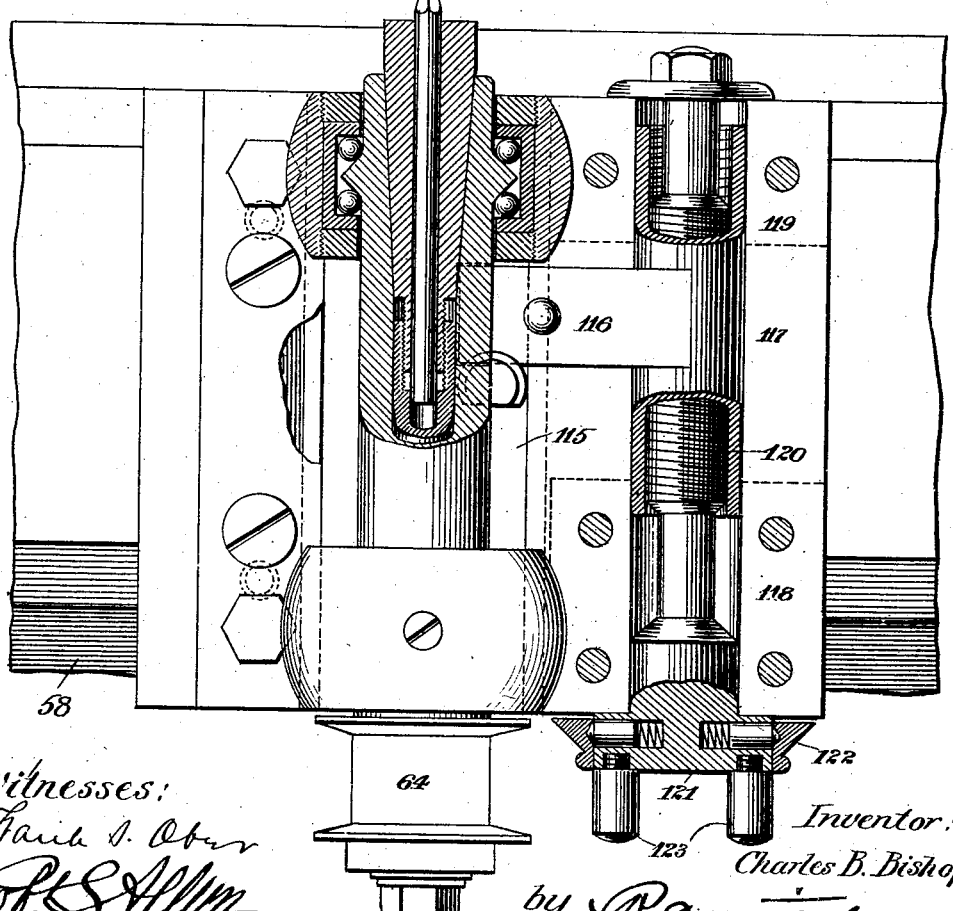
Figure 19:
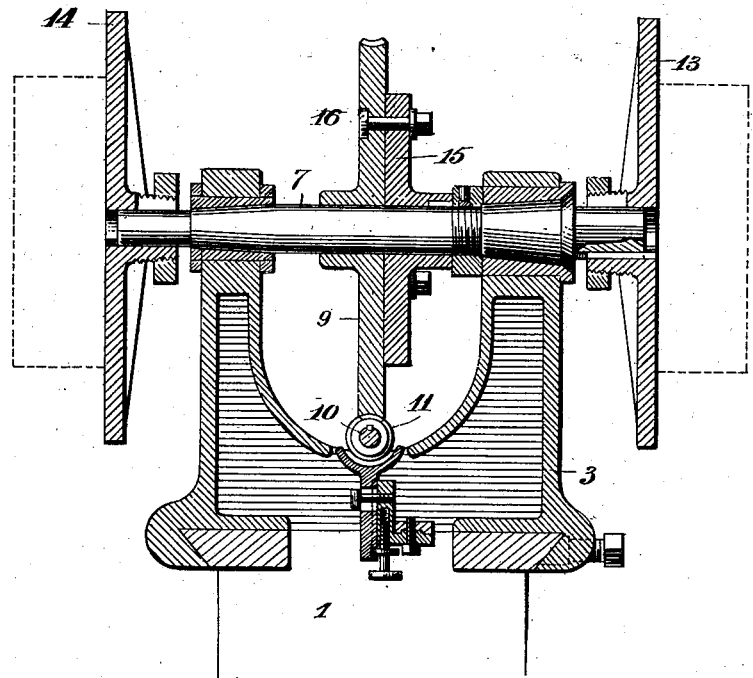
Figure 20:
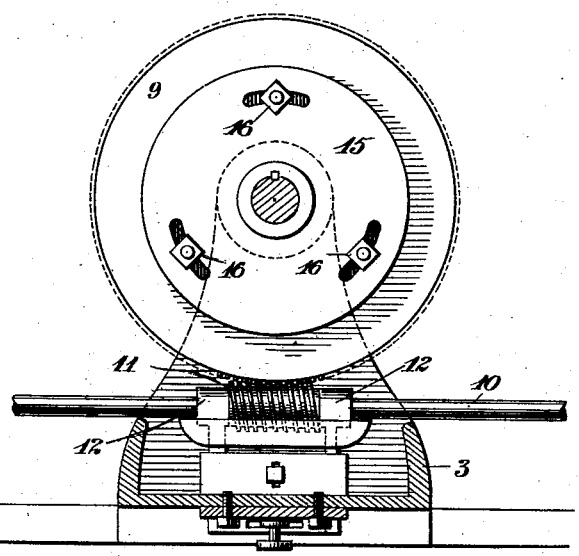
Figure 21:
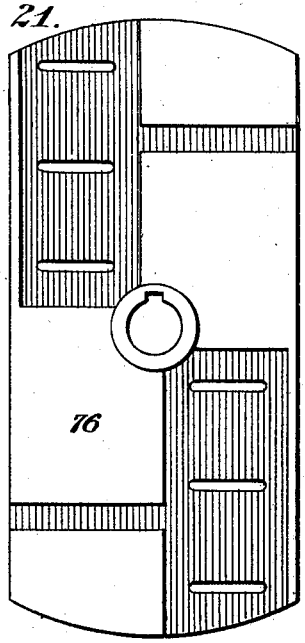
Figure 22:
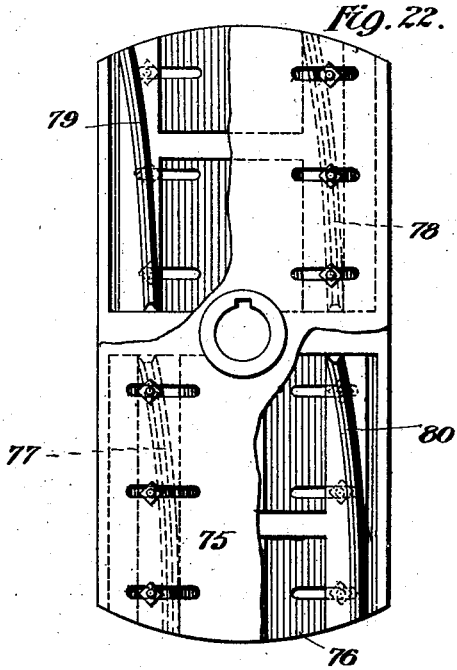
Figure 23:
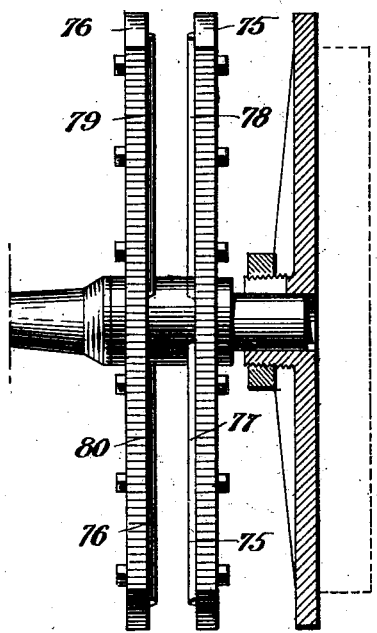
Figure 33:
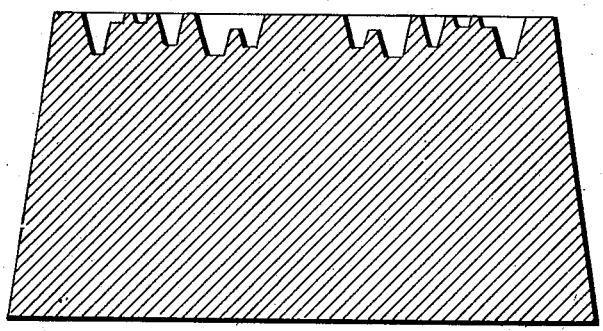
Figure 34:
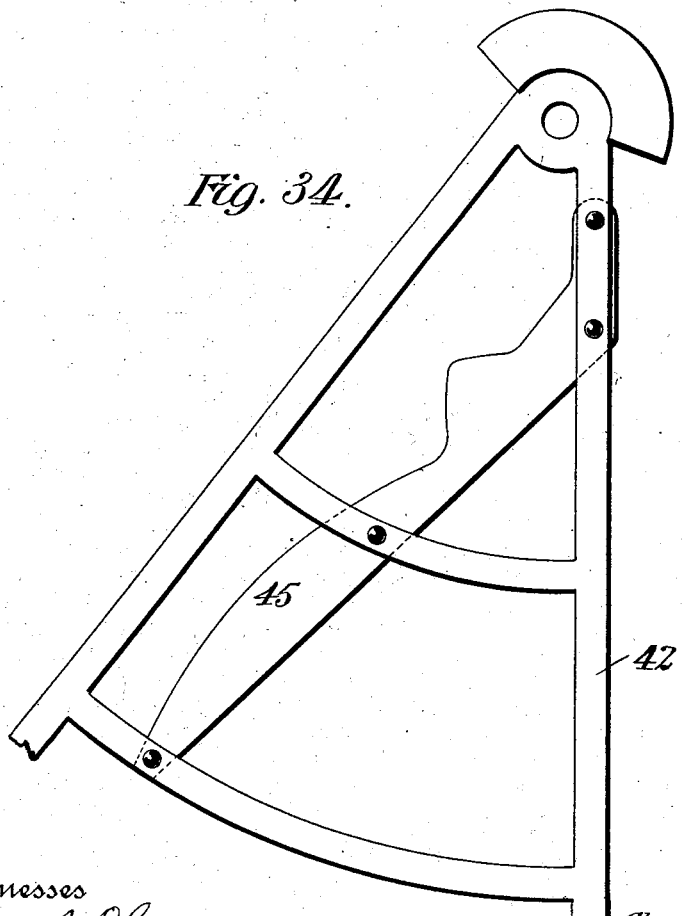

In the drawings, Figure 1 is a general view of the machine, illustrating a side elevation of the same. Fig. 2 is an end elevation of the machine shown in Fig. 1 looking from right to left. Fig. 2ª is a plan view of certain detached details of construction. Fig. 3 is a plan view of the machine shown in Fig. 1. Fig. 4 is an end elevation of the machine shown in Fig. 1 looking from left to right. Fig. 5 is a relatively enlarged detail view of the upper right-hand portion of the machine as it appears in Fig. 1, taken partly in section. Figs. 6 and 7 are fragmentary detail views. Fig. 8 is a perspective view, relatively enlarged, of details of construction located on the machine as shown at the upper right-hand corner of Fig. 1. Figs. 9, 10, 11, and 12 are a series of views illustrative of clutch mechanism. Fig. 13 is a plan view of a cutter and means for adjusting the same. Fig. 14 is a relatively enlarged view of the cutter shown in Fig. 13 and the parts directly adjacent thereto, said view being partly in section. Figs. 15, 16, 17, and 18 are a series of views illustrative of variable-speed mechanism employed in my machine. Fig. 19 is a transverse section through what is termed one of the heads of the machine upon which the block to be cut or the pattern-block may be carried. Fig. 20 is a front elevation of the parts shown in Fig. 19, a portion of the frame being removed to show details of construction. Figs. 21, 22, 23, and 24 are a series of views illustrative of a certain detail of construction hereinafter described. Figs. 25, 26, and 27 are a series of diagrammatic views hereinafter described. Fig. 28 is a front elevation of a pattern of circular form. Fig. 29 is a front elevation of a pattern of elongated rectangular form. Fig. 30 is a section of the pattern shown in Fig. 29. Fig. 31 is a front elevation of a block of metal or other material which it is intended to work into the form of the pattern 29. Fig. 32 is a section of the block illustrated in Fig 31. Fig. 33 is a section of a die in which a portion of the surface pattern is very shallow and other portions very deep. Fig. 34 is a front view of a detail of construction.

In working sheet metal by means of dies it is customary to drive the sheet metal into a die, so that the pattern thereof will be transferred to the sheet metal. To do this, a tool called a "force" is required. To that end, therefore, the force should be the same pattern as the die, excepting reversed.

By the machine hereinafter described it is possible to cut in one and the same operation a "die" and a force. It is also possible to cut one or more dies, if desired, but not necessarily of the same pattern. The construction of the machine is such that a design of elongated outline may be cut with nearly the same rapidity as a design of circular outline.

Generally speaking, the machine operates as follows: A pattern is placed upon a suitable revolving carrier, and a block of metal or other desired material is placed upon another carrier revolving in time with the pattern-carrier. A swinging arm universally mounted carries a tracer or stylus which yieldingly bears upon the face of the pattern, the arm allowing said tracer to follow the irregularities of the pattern as the same is revolved. Mounted upon the arm is a suitable cutter, which in the particular form shown is rapidly revolved, so as to cut into the surface of the die-block and reproduce a design similar to the pattern. Both the stylus and cutter being mounted upon the same arm, manifestly they move in and out and up and down simultaneously and preserve always the same relative position. Ordinarily the die is started by commencing at substantially the center of the pattern. When the machine is started, the cutter is revolved rapidly, while the pattern and die-carriers are revolved slowly, so as to carry the pattern slowly around in front of the stylus and the die-block slowly around in front of the cutter. The relative speed of the travel of the die-block in front of the cutter should be and is so timed that the cutter may have ample opportunity to work out the metal. It will be seen that as the cutter moves down and away from the center of the die-block the speed at which the metal passes in front of the cutter would be steadily increased unless provision were made to preserve uniformity. In the machine hereinafter described it will be seen that provision is made whereby the metal is brought into contact with the cutter at substantially the same speed irrespective of the diameter of the die and irrespective of the position at which the cutter is working.

In producing a die of circular form, such as a door-knob, the cutter is working practically all of the time. In producing a die of rectangular form, Fig. 31, such as an escutcheon-plate, it will be seen that after the narrowest part of the die has been cut and the larger diameters are approached there will be a space of time in which the cutter is doing no work. Consequently valuable time would be lost in shaping this kind of a die were it not for the provision of means whereby the pattern and die-carriers are caused to travel rapidly across the space while the cutter does no work and then slow down to the desired working speed.

By means of certain features of construction there is no unnecessary waste of time in forming a die, and practically any pattern can be reproduced accurately and of any desired size relatively to the pattern employed.

The machine is constructed substantially as follows:

1 is a suitable frame or standard carrying heads 2 and 3, which are capable of being independently adjusted longitudinally on said frame. These heads 2 and 3 will be termed the "pattern-head" and "die-head," respectively.

4 is a block which may also be adjustably mounted, which block may carry an adjusting-screw 5, taking into a portion of the die-head 3 in such manner that the accurate adjustment of said head may be easily effected.

6 is a spindle mounted in the head 2.

7 is a spindle mounted in the head 3.

8 9 are worm-wheels carried, respectively, by the spindles 6 and 7.

10 is a shaft carrying worm-screws 11 11, substantially as shown in Figs. 19 and 20. These worm-screws may be connected to the shaft 10 by means of a feather-spline, but may be held from unintentional longitudinal movement by suitable collars 12 12.

In Figs 19 and 20 the heads and other associated parts are shown relatively enlarged, and reference is therefore directed thereto. In said figures it will be seen that the spindle 7 may carry at one or both of its extemities face-plates 13 14, upon which may be carried, as shown by dotted outline, a pattern or a block of metal in which it is intended to form the die or force. For convenience of adjustment of the die-plate and pattern-plate relatively to each other it is preferred to have the wheels 8 and 9 attached to the spindles 6 and 7 through an intermediate connecting plate or disk 15, such as shown in Figs. 19 and 20. In the plate 15 are slots through which may pass bolts 16 and by which the worm-wheel may be adjustably secured to the plate 15, and thereby to the spindle. By this means it will be seen that the pattern and the die may be lined up properly before starting the machine. The shaft 10 is supported in bearings 17 and 18, located at each end of the frame 1.

At one end of the main shaft 10 is a clutch member 19, which is feathered upon said shaft, so as to slide longitudinally thereon. Facing one end of this member is the pulley 20, which is connected by a belt to a driving-pulley hereinafter to be described. The pulley 20 will be designated the "slow" pulley. Facing the opposite end of the clutch member 19 is a pulley 23, similar to pulley 20 in construction, but driven at a higher rate of speed. This pulley 23 will be hereinafter designated as the "fast" pulley. It will be seen that shaft 10 may be driven rapidly or slowly, according to which of the pulleys 20 or 23 the clutch member 19 is engaged with. The details of the clutch are clearly shown in Figs. 9 to 11, inclusive. The clutch member 19 carries at opposite ends friction disks or rings 24. The pulleys 20 and 23, as shown in Fig. 10, are each hollowed out and provide a frictional contact-surface against which the friction-rings 24 may impinge.

25 represents a spring-pressed nose set into a radial socket in the member 19, the end of which may bear against a stationary nose 26, fixed within the shaft 10. The member 19 is held tightly against the pulley 20 or tightly against the pulley 23, and the contacting beveled sides of said noses 25 26 prevent the stopping of the clutch member 19 at an intermediate position. Both the pulleys 20 and 23 are rotated constantly, and it is intended that the change of speed of the shaft 10 from fast to slow shall be accomplished automatically. Since the cutting action of the machine takes place during the action of the slow pulley 20, it is desirable that there be a positive lock between the shaft 10 and said pulley during the period of such action. The hub of pulley 20 is therefore provided with one or more pawls 28, which engage the teeth of a ratchet-wheel 29, secured to shaft 10. The ratchet 29 is fixedly secured to the shaft 10, so that it will rotate therewith. In order to prevent the possibility of any slippage when the slow pulley is in action or interruption of action when the clutch is being shifted from the slow to the fast pulley, the pawls 28 engage with the ratchet 29, so that when the clutch member 19 is in engagement with said slow pulley the latter will be connected with the shaft 10 not only through said clutch member, but also through said pawls 28 and ratchet 29. When the clutch member 19 is shifted into engagement with the fast pulley 23, the speed of the fast pulley is transmitted, through said clutch member, to said shaft 10, which latter carrying the ratchet 29 causes the same to slip past or run away from the pawls in the direction of the arrow indicated on Fig. 12.

Figure 9:
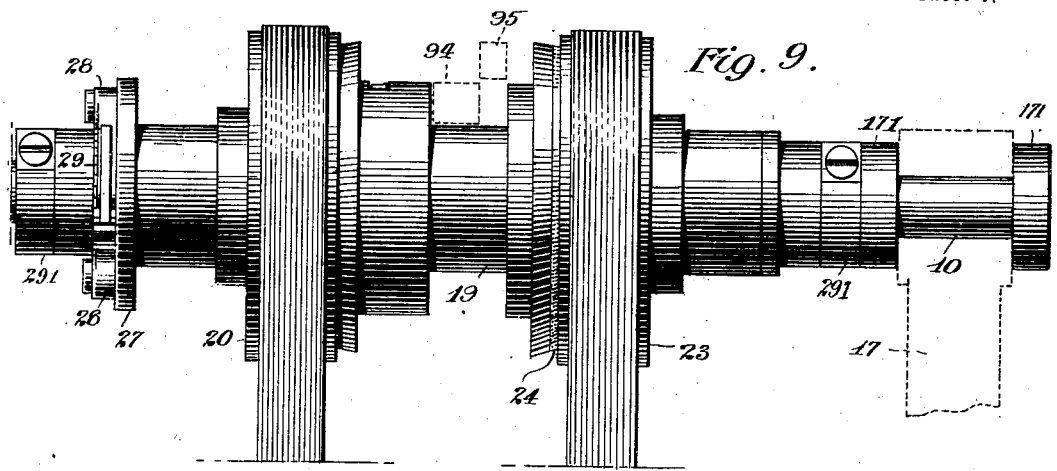
Figure 10:
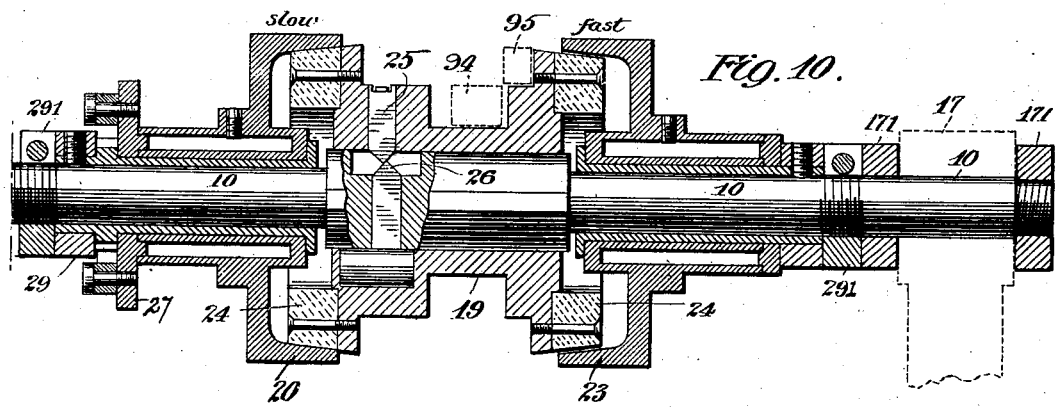
Figure 12:
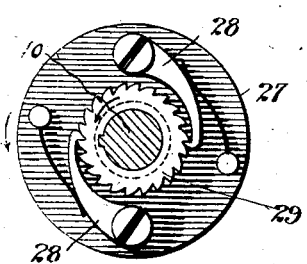
Figure 11:
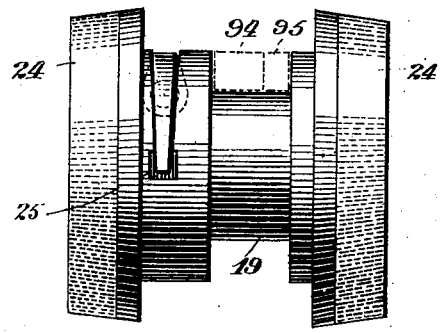

In Figs. 9 and 10, 171 171 are thrust-bearings suitably adjusted upon the shaft 10, so as to prevent longitudinal movement of said shaft relatively to its bearing 17.

291 291 are adjustable collars mounted upon shaft 10, by which the position of the pulleys 20 and 23 may be varied relatively to the throw of the clutch member 19, so that the same may be permitted to take proper hold. The slow pulley 20 is driven from pulley 31 by means of suitable connections, such as a belt. The pulley 31 is mounted upon a shaft supporting a cone 32.

33 is a cone, and 34 is an endless belt located between the cones 32 and 33 and through the medium of which the rotation of the cone 33 is transmitted to the cone 32. The cone 33 is mounted upon shaft 35, which may be provided with a suitable pulley 36, which in turn is connected with the source of power. The speed of cone 32 relatively to cone 33 may be varied by shifting the position of the belt 34. The cone 32 may be freed from engagement with the belt 34 and cone 33 by means of a suitable shifting device, (shown more in detail in Figs. 15 to 17, inclusive,) in which the shaft of the cone 32 is supported in a frame 37, pivoted in such manner—for example, at 38—that the frame may be tilted by means of a cam 39. This tilting of the frame 37 may move the cone 32 from the position shown in Fig. 16 to the position shown in Fig. 17, in which latter position it is freed from the belt 34 and cone 33. It is by means of these cone-pulleys (the general construction of which no invention is claimed herein) that the speed of the shaft 10 is varied, so that thereby the speed of rotation of the pattern and die-plates is varied and controlled during the working out of the die.

When the die is of the outline indicated in Fig. 1, it is desirable to have the pattern and die plates turn rapidly for that period of their rotation during which the cutter is idle. Accordingly the clutch member 19 is automatically shifted, so as to disengage the shaft 10 from the slow pulley 20 and engage it with the fast pulley 23. The fast pulley 23 is driven by the pulley 40, which is in turn driven at a constant speed from a pulley on the line-shaft 41.

The means whereby the proper variation in the speed is automatically determined comprises a sector 42, pivotally mounted at 43 in the frame 1.

44 is a counterweight.

45 is a cam-bar upon the sector 42.

46 is a roller carried by a plunger 47, Fig. 8, controlled as hereinafter described, the movement of which roller up or down determines the position of the sector 42.

461 is a guide-bar, Fig. 8, carried by the frame or standard 1 and provided for the purpose of insuring a correct alinement of action of the roller 46 as it is elevated or depressed.

48 is a chain or other flexible connection leading over the arc of the sector to and around suitable pulleys 49, thence to a belt-shifting device 481, by which the position of the belt 34 is determined. The belt-shipper 481, Fig. 18, is provided with a clamp-screw 482, by which the same may be disconnected from or adjusted upon the chain 48. From the belt-shifting device the said connection 48 continues to and over pulley 50 and thence to counterbalance or weight 51. The downward pull of the weight 51 tends to normally position the belt 34, as shown in Fig. 1, in which the transmitted speed from shaft 35 to shaft 10 is at the maximum. During the operation of the machine and as the cutter gradually works away from the center of the die the plunger 47 will gradually descend and will cause the sector 42 to swing back in such manner as to shift the belt 34 between the cone-pulleys and gradually reduce the transmitted speed from shaft 35 to the shaft 10. The plunger 47 is carried by the cross-head 52, which is capable of being moved up and down on an extension of the frame 1.

53 is a screw-threaded shaft passing through the cross-head 52 and by the rotation of which the said cross-head is elevated or depressed.

54 is a worm-wheel splined to the shaft 53.

55 is a shaft carrying an endless screw which meshes with the worm-wheel 54. The shaft 55 carries the sprocket 56, a series of which may be employed, if desired, for the purpose hereinafter described. Upon the shaft 6, supporting the worm-wheel 8, is another sprocket or series of sprockets 57. One of the sprockets 57 may be connected to one of the sprockets 56 by a suitable flexible connection. By the rotation of the pattern and die carriers motion will be transmitted to the shaft 55, which in turn will transmit a rotative movement to the screw 53, which in turn moves the cross-head 52, which in turn moves the plunger 47, which in turn moves the sector 42, which in turn controls the position of the belt 34, and consequently the speed of rotation of the pattern and die plates. The speed of shaft 53 relative to the speed of shaft 6 may be varied as desired by shifting the flexible connection between the sprockets 56 and 57, which may be provided in varying ratios.

From the foregoing it will be seen that the working speed of the machine is controlled by the cam-bar upon the sector 42, the shape of the cam-bar over which the roller travels determining the same. The speed of the machine—that is, the speed of rotation of the pattern and die when no work is being done by the cutters—is controlled by the tripper-bars and the parts coacting therewith, whereby the said pattern and die are caused to revolve quickly over that space in which the cutter has no work to perform. The particular shape of the edge of the cam-bar 45, over which the roller 46 travels, may be varied. It may be worked out upon a gradual curve, so that the speed of rotation of the pattern and die may be slowed down gradually to cause the amount of work done by the cutter to be practically uniform, or it may be worked out upon an irregular curve—for example, as shown in Fig. 34—in which the speed of the pattern and die may be quite quickly varied. This variation is a desirable feature, because the cutter can more rapidly perform its function in cutting a very shallow design than it can when working out a very deep design.

In Fig. 33 is illustrated a section through the center of a die, a portion of which is very shallow, while other portions of which are very deep. Obviously the speed at which the die-spindle is revolved, which determines the working speed, may be faster while the cutter is traveling across the shallow part than it is while the cutter is traveling across the very deep part, and in order to vary this working speed it is simply necessary to lay out the edge of the cam-bar over which the roller travels so as to get this diminished or accelerated working speed, as desired, by the shifting of the belt 34 between the cone-pulleys 32 33. This possibility of varying the working speed by varying the face of the cam-bar is advantageous in that the cutting-tool is not required to perform more work than it can properly execute and in that it is always required to execute practically the full amount of work that it is capable of successfully doing.

From the foregoing it will be seen that the cone-pulleys, the swinging cam, the driver, and the associated parts perform the function of and may be properly termed a "speed-controller" or "speed-controlling means."

I shall now proceed to describe the means carrying the cutter and the pattern-stylus and the mechanism associated therewith by which the same is controlled.

58 is a beam mounted in a suitable universal joint 59 at one end and suspended at its other end by means of a yoke 60, which is preferably mounted on ball-bearings upon a track at the ends of the cross-head 52, which, it will be remembered, is movable up and down by screw 53. In view of the fact that the beam 58 may move in and out, and in view of the fact that the cross-head 52 may be raised and lowered, a stylus 61, carried by the said beam, may follow the irregularities of any pattern which is caused to move in front of the same.

62 is a suitable counterweight by which the beam 58 is caused to normally move toward the pattern, so that the stylus will bear upon the face of said pattern with the desired pressure and so that the cutter will be held properly to its work. In the drawings a beam 58 is shown on each side of the machine. The support for each end of the beam 58 is provided with any suitable means whereby the beam may be adjusted as to height, so as to secure the correct centering of the pattern-stylus and cutting-tool independent of the cross-head 52.

63 is a cutter, the same being preferably a pointed tool which is revolved at a high velocity and capable of acting both as a drill and a milling device. The cutter is best illustrated in detail Figs. 13 and 14, in which the said tool is carried by a shaft having suitable antifriction-bearings and having a pulley 64 at its outer end. Referring to Figs. 2 and 3, it will be seen that in the preferred form of the machine there is a beam 58 on each side of the machine and a cutter 63 on each beam.

The construction of the beam carrying the stylus and cutter is important and valuable in that the tools may be adjusted thereon and held in such manner to their work that there will be no deflection. The special construction gives great rigidity, and the strains and stresses in every direction are readily absorbed without varying in any way the relative position of said tools. This is of great advantage, because it permits of the variable adjustment of the stylus and cutter without danger of altering the centers. The construction of the beam is best shown in Figs. 1, 2, 3, and 5, in which it will be seen the upper part of the bar is broad and flat and narrowed toward each end. The beam 58 is provided with a track 581, (preferably dovetailed,) upon which the stylus-frame and the cutter-frame are mounted so that they may be adjusted longitudinally thereon, the said frames being shaped to take onto the said track and be secured thereto in any desired position and by any suitable means. The under side of the flat upper portion of the beam is provided with a downwardly-projecting rib. The flat upper portion of the beam and the depending rib are preferably formed integrally, and being arranged at right angles resist deflection in every direction. In order to lighten the beam, if desirable some of the metal may be bored out, as shown in Fig. 3. The cutters 63 are driven by an endless belt 65, passing over pulley 66.

67 is a belt connecting pulleys 66 and 68. The pulley 68 is mounted upon shaft 69, which may have suitable bearings in the frame and which may carry a pulley 70. The pulley 70 is driven by a cross-belt 71 from a pulley on the line-shaft 41. The particular lead of the endless belt 65 is clearly shown in the drawings and need not require special description, since any desirable arrangement of pulleys to effect a proper lead may be employed. In order to provide the proper tension upon the endless belt, the pulley 66 is carried on an arm 72, mounted concentrically with pulley 68.

73 is a lever projecting from the arm 72, upon which a suitable spring or counterweight 74 may be placed, so as to swing the frame 72, and thereby the pulleys 66, and take up any slack in said endless belt 65.

The mechanism thus far described provides a constant and uniform speed for the cutters, and it provides a means whereby the cutters may be moved in and out or up and down, and it provides an automatically-controlled mechanism for reducing the speed of rotation of the pattern and die plates as the cutters work away from the center of the die, so that the amount of work that each cutter is required to do in a given space of time will be no more when the cutter is working at a distance from the center of the die than when it is working at any point closer to the center of said die.

The means thus far described will expeditiously work out any pattern of circular form; but inasmuch as some patterns are of an elongated form—for example, a pattern for an escutcheon-plate—it is obvious that after the cutter has worked out the full width of the center of the die there will be an interval of time, increasing as the radius is enlarged, in which the cutter will be performing no work whatever.

In order that no unnecessary time may be lost, automatic means is provided whereby the pattern and die carriers are caused to revolve rapidly, so as to carry said pattern and die around to the position where the cutter again takes hold, at which instant the speed of the said parts is automatically reduced to the working speed determined by the transmitted speed from shaft 35 to shaft 10 through slow pulley 20. The function of this fast pulley 23 is to cause this quick rotation of the pattern and die, and means is provided to automatically throw the clutch member 19 from engagement with the slow pulley 20 into engagement with the fast pulley 23, and vice versa, at the proper time. This means is illustrated diagrammatically in Figs. 25 and 26, in which 75 and 76 are plates carrying what will be termed "tripper-bars." The plate 75 carries the tripper-bars 77 78, and the plate 76 carries the tripper-bars 79 80. 81 is a tripper-arm having a pair of fingers 82 at its end adapted to project into the path of movement of the tripper-bars, the fingers being adapted to be engaged by said tripper-bars to shift the tripper-arm, as hereinafter described. 83 is a lever controlled by the tripper-arm 81, which lever 83 engages with the clutch member 19, so that when the said tripper-arm is shifted back and forth the clutch member will likewise be shifted to engage either the pulley 20 or the pulley 23. When the tripper-arm 81 is in the position shown in Fig. 25, clutch-member 19 is in engagement with the slow pulley 20. Consequently the working speed is being transmitted to the pattern and the die carrying plates. When the tripper-arm 81 is in the position shown in Fig. 26, the clutch member 19 is in engagement with the fast pulley 23, in which position the high speed is being imparted to the pattern and the die to cause them to travel rapidly while no work is being done by the cutter.

Figure 24:
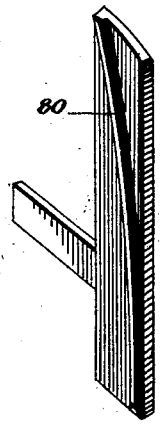

It is important that high speed be imparted to the pattern and die carriers the instant that the cutter leaves its work upon the die—in other words, at the instant the stylus leaves the edge of the pattern—since by so doing a very great saving in time is effected. It is also important that the stylus and cutter be held out of engagement with any portion of the pattern or die block during this interval of fast movement of the pattern and die carriers, and to that end, therefore, it is preferred to provide a mechanism such as shown in Figs. 25 and 26, comprising a bell-crank lever 84, one end of which coacts with the clutch member and is controlled thereby, the other end of which engages suitably with the bar 85, which in turn engages with a suitable blocking-out device 86, shaped generally as a bell-crank lever, one end of which is engaged by the bar 85, while the other end is capable of engaging with the beam 58 or an extension thereof to hold the same outwardly sufficiently far to entirely free the cutter 63 from the die-block. The tripper-bars 77 to 80 perform practically the function of cams, and they are so positioned relatively to the pattern that when the edge of the pattern is reached one of said tripper-bars will move the tripper-arm in such manner as to shift the clutch member 19 into engagement with the fast pulley. For example, looking at Figs. 25 and 26 and assuming the pattern is turning in a direction opposite to the hands of a clock, the tripper-arm 81 will be tilted first by the tripper-bar 78, thus throwing the clutch 19 into engagement with the high-speed pulley 23, which will cause the quick rotation of the pattern and die-heads. When the pattern has turned sufficiently far, the tripper-bar 80 will engage with the tripper-arm 81, throwing it back to the original position, which slows down the speed of the pattern and die-heads to the proper degree to allow of the working out of the metal by the cutter. As soon as the cutter has worked across the face of the die-block the tripper-arm 81 then is engaged by the tripper-bar 77 which is on the opposite end of the plate from the tripper-bar 78. The tripper-bar 77 throws the clutch member into engagement with the fast pulley 23, causing the quick rotation of the pattern and die carriers, as before described, which continues until the pattern again approaches a position where it is desired to slow down the parts to permit the cutter to work properly, at which instant the tripper-bar 79 causes the clutch member 19 to be thrown back into engagement with the slow pulley 20. This operation is repeated, and the presence of the tripper-bars and their adjustment determines the moment that the high speed shall be commenced and the period that it shall be maintained. A detailed view of the tripper-bars and their associated parts is shown in Figs. 21 to 24, inclusive, in which the plates 75 76 are shown to be slotted to receive bolts which adjustably hold said tripper-bars. A detail of one tripper-bar is shown in Fig. 24. It will be observed that the beam 58 is hinged at the point 59 and moves in the arc of a circle. The tracer-point and the cutter therefore describe an arc in a downward movement of the beam. It is preferred that the tripper-bars form the same arc of a circle which corresponds with the arc described by the tracer-point, thus providing for complete accuracy in the matter of the time of operating the tripper-arm. The arrangement of the tripper-bars is shown best in Fig. 22, and it will be seen that each bar is of a length only about one-half of the length of the tripper-plates 75 76. They operate successively in the arrangement shown in Figs. 22, 25, and 26 to shift the clutch member, as before described.

The blocking-out device referred to is best shown in detail in Fig. 5, in which 86 illustrates said blocking-out device in its idle position. 87 is a projection from the yoke 60, which supports the beam 58. As before described, the normal tendency of the beam is to swing inward, and a stationary stop 88 is preferably provided, whereby the limit of the inward swing of said beam is determined. In operation when the stylus 61 has moved onto the extreme outer face of the pattern and the pattern is of such an outline that the die and pattern are momentarily revolved at high speed the stylus causes the beam 58 to be swung outward to such an extent that the inner end of the rod 87 is outside of the blocking-out device 86, which, as before described in referring to the diagrammatic views, Figs. 25 26, is depressed or moved into such a position during the fast rotation of the pattern and die that it acts as a stop to block or hold out the beams 58 58, so that neither the stylus nor the cutting-tool can move inwardly and engage their respective parts during the period of fast rotation of the pattern and the die being formed. It is preferred that the extent to which this blocking out is effected may be varied—for example, by means of washers or plates 89, which may be secured to the end of the blocking-out device in any desired number to either lengthen or shorten, as necessary, the said device. This is shown in detail in Fig. 7, in which eight plates are illustrated, four of them being in the operative position and determining the operative length of said blocking-out device. In order to throw the beam out sufficiently far to permit the blocking-out device to drop behind the end of the rod 87, the face of the pattern at the margin thereof—for example, as shown in Figs. 29 and 30—may be built out, as indicated at 90.

Referring to Figs. 5 and 8, 91 represents a frame pivotally supported in the standard 92 and the bracket 93, supported by the frame 1. To the lower portion of this frame is secured a lever 83, which, as before described, engages with the clutch member 19. It should be stated here that the lever 83 is composed of two parts, one of said parts, 94, being fixedly secured to the frame 91 and the other of said parts, 95, being pivotally secured to the same and having an outwardly-extending tailpiece 96. Mounted within the frame 91 is a vertical shaft 97, screw-threaded for a suitable portion of its length. At the upper end of the shaft 97 is a spur-wheel 98, and surrounding said shaft is a nut 99, secured to the vertically-sliding block 100 in such manner that rotation of shaft 97 will cause block 100 to move in a vertical direction, the sides of the frame 91 providing suitable guiding-faces for the block. Depending from block 100 is a spindle 101, having an adjustable outwardly-projecting tripping-finger 102 thereupon. Also depending from the frame 91 is a latch 103, pivoted at 104 and having a notch at the lower end thereof which is adapted to engage the tailpiece 96 of the lever 95 under certain conditions and hold the outer end of said lever out of engagement with the clutch member 19. The spur-wheel 98 is intended to be driven by the spur-wheel 105 on the shaft 53. Spur-wheel 105, however, during a certain period of the operation of the machine will be held out of operative engagement with wheel 98. This position is indicated in Figs. 1, 5, and 8, said wheel being supported upon rollers mounted in upwardly-extending posts 106 from the cross-head 52. The cross-head, as before described in the regular operation of the machine, is gradually moved downward, and in doing so allows the wheel 105 to slide downwardly on shaft 53 until it meshes with spur-wheel 98 and rotates shaft 97. The effect of the rotation of shaft 97 will be to cause the block 100 to rise, and assuming the parts to be in the position indicated in Figs. 5 and 8 will cause the trip-finger 102 to engage with the latch 103 at the point 107 and swing the latch away from the tailpiece 96 and allow the lever 95 to drop into the groove of the clutch member 19. It will be observed that the lever 83 as a whole is adapted to quite fill the groove in clutch member 19, so that any movement imparted to said lever as a whole will be imparted to the clutch member. When, however, the part 95 of the lever is in the raised position indicated in Fig. 5 and shown in dotted lines in Figs. 9 and 10 the remaining part of said lever may be moved without affecting said clutch member 19.

Figs. 1, 5, and 8 illustrate the positions of parts at approximately the beginning of the operation of the machine. It will be seen, therefore, that the machine will run for a time without actuating the shaft 97, so maintaining the slow speed of the shaft 10. This is all that is necessary when a pattern of circular outline is being employed; but when a pattern of an outline other than circular—for example, rectangular—is employed after the central part of the said die has been entirely worked out and the ends are being shaped the aforesaid mechanism for effecting the shifting of the clutch member is automatically brought into operation, thus saving time that would otherwise be lost in the working out of the ends of the die to correspond with the ends of the pattern.

The tripper-arm 81, the operation of which is described in detail in referring to Figs. 25 and 26, is attached to the block 100, which block serves as an intermediate connection between said tripper-arm 81 and the lever 83 referred to. In the operation of the device the tripper-arm 81, although it is permitted to rock, does not perform any function until after the central portion of the die has been entirely worked out. When the ends of the die are being worked out, the position of the parts will be such that the motion of the gear 105 will be transmitted to the gear 98, thus elevating the trip-finger 102 until it trips latch 103, at which instant the two parts 94 and 95 of the lever 83 are brought side by side and fill out the annular groove in the clutch member 19, so that from that time on until the ends of the die are completed the shifting movement of the tripper-arm 81 is transmitted to the said clutch member 19 for the purpose hereinbefore fully described.

A suitable means may be provided to stop the feed of the machine at the end of the work, the preferred construction of which is shown in the drawings with particular clearness in Figs. 2, 2ª, and 8. As before described, during the operation of the machine the crosshead 52 is lowered by the action of the screw on shaft 55 taking into the gear 54 upon the screw-shaft 53. The bearing 108 for the shaft 55 is preferably pivoted, so that the screw may be engaged or disengaged from gear 54. A bearing 109 for the shaft 55 may be a block capable of sliding outwardly on the top of the frame of the machine and is normally pressed outwardly under the influence of the spring 110. A latch 111 may hold the said bearing 109 in such a position that the screw on shaft 55 will engage with the gear 54. 112 is a knock-out rod, adjustable as to height, carried by the block 100, the line of movement of said rod being underneath the latch 111. The rod 112 is so adjusted that when the work is completed the said rod 112 will engage with the latch 111 and trip it, freeing the bearing 109 and permitting the spring 110 to swing the shaft 55 upon its pivotal bearing 108 and disengage the screw on said shaft from the worm-wheel 54. This, in effect, stops the machine, because it stops further work. If the machine itself is not disconnected from the motive power, the die and pattern simply travel around and around, while the beam 58 holds the stylus and the cutter at the same point of elevation and ceases to feed the cutter into the path of new work.

From the foregoing it will be seen how a die or a force may be formed. By referring to Fig. 27 it will be seen that by connecting the two beams 58, located on the opposite sides of the machine, by means of a link 113 and by employing one pattern on one side of the machine a die—for example, 114—will be formed on one side by the cutting-tool, and a force—for example, 115—will be formed on the other side at the same time. The link 113 is preferably made of two parts held together by a suitable turnbuckle or other suitable device, so that the length of the link may be varied, thus permitting the adjustment of the beams on opposite sides of the machine so that they will take a proper position relatively to each other. One side of the machine may be used independently of the other, or they may both be used simultaneously to produce dies of different patterns, or they may be used conjointly, as before stated, to produce from one pattern a die and a force. The machine may also be used to make a pattern from a pattern or a pattern from a die. In the particular form shown in the drawings the purpose is to reproduce in a block of metal a die or a force to correspond to the pattern. Obviously with a given die or force of a desired pattern a reproduction thereof may be made in plaster-of-paris or other suitable material to be used as a pattern in case the original pattern is broken, lost, or destroyed or in case a duplicate is needed, and to accomplish this it is merely necessary to reverse the position of the stylus and the cutter upon the beam 58.

In Figs. 13 and 14 I have shown the relatively enlarged views of the cutter-head. In Fig. 14 a suitable chuck for the retention of the cutter is illustrated, but need not require specific description, as no novelty is claimed thereof. The chuck, however, is carried by the sliding block 115, having a recess therein, into which extends a projection 116, carried by a longitudinally-movable sleeve 117, mounted in suitable bearings 118 and 119. 120 is a screw threaded within said sleeve 117 and provided with a knob 121, whereby the same may be rotated and the position of the sleeve 117 varied as desired. 122 is a graduated scale in the form of a ring frictionally mounted upon the knob 121. 123 represents handles or projections to afford a convenient means for grasping the knob. Manifestly by turning the knob in one direction or the other the cutting-tool may be advanced or retracted accordingly. To ascertain the exact position of the point of the cutting-tool at any time and in order that the slightest wear may be detected and compensated, I provide a finder constructed substantially as follows: In Fig. 13, 124 is a lever carried upon a bracket mounted adjustably on track 581. One end of the lever 124 is adapted to be moved so as to engage the point of the cutter, the other end of which bears against an offset upon a pointer 125. 126 is a central point on the index traversed by the pointer 125. Assuming it is desired to position the cutter exactly as shown in Fig. 13, the knob 121 is turned until the cutter, through the medium of the lever 124, will cause the pointer 125 to point directly to the mark 126. This may be termed the "known point" or "starting-point." If it is desired to have the cutter project inwardly, say, one-tenth of an inch and it is known that the pitch of the thread on the screw 120 is one-tenth of an inch, it is simply necessary to rotate the handle for the knob 121 one complete revolution. In order to enable the user to know with accuracy that he has rotated said screw one revolution, the graduated scale 122 is first turned so that the pointer or index-finger 127 will point to the zero-mark on said scale 122. He may then turn the knob, and said scale (being mounted friction-tight upon said knob) will travel around with the knob until the zero-mark is again reached, whereupon it is known that the screw 120 has been rotated exactly one revolution and that the cutter has been advanced or retracted exactly one-tenth of an inch. If it is desired to retract or advance said cutter a fraction of one-tenth of an inch, the same may be readily determined by simply rotating said knob 121 the desired fraction, which will be indicated by the graduations upon said scale 122.

What I claim is—

1. In a metal-working machine, a pattern-carrier on one side thereof, a die-carrier on each side thereof, means for rotating the pattern-carrier and die-carriers at the same angular speed, a beam on each side of the machine said beams being universally mounted and engaged with each other, and stylus and cutting tools carried by said beams.

2. In a metal-working machine, a pattern-carrier on one side thereof, a die-carrier on each side thereof, means for rotating said carriers at the same angular speed, a beam on each side of the machine one end of each of said beams being pivotally mounted, the said beams being engaged with each other at the other ends, and stylus and cutting tools carried by said beams.

3. In a metal-working machine, a pattern-carrier, and die-carrier, means for rotating the same at like angular speed, a stylus adapted to follow the irregularities of the pattern as the pattern is revolved, a cutting-tool adapted to engage with and work into the die-block, means for rotating the pattern and die carriers, at a variable speed, said means including a pair of cone-pulleys and a belt connecting same, and a means for shifting said belt including a cam and a device coacting with said cam to move the same.

4. In a metal-working machine, a cutting-tool, means to guide the same, a die-carrier, and means to revolve the same, and means to reduce the speed of rotation of said die-carrier as the cutter works away from the center of the die or increase the speed of rotation of said carrier as said cutter works toward the center of the die, said means including a swinging cam-bar, a driver therefor, and a variable-speed-changing device controlled by said cam-bar.

5. In an engraving-machine, a cutter, a stylus, means for supporting said cutter and stylus and causing the same to move correspondingly, pattern and die carriers, means for rotating the same, means for shifting the position of said cutter and stylus, and means to reduce the speed of rotation of said die-carrier as the cutter works away from the center of the die and vice versa, said means including a swinging cam, a driver therefor, and a variable-speed-changing device controlled by said cam.

6. In an engraving-machine, a cutter, a die-carrier, means for rotating the die-carrier, means for controlling the position of the cutter, a speed-controller for said die-carrier including a variable-speed mechanism, a swinging member connected thereto, a cam carried by said swinging member, and a driver for engaging with said cam to swing said member.

7. In a metal-working machine, a cutter and a stylus and means for carrying the same, a pattern-carrier, a die-carrier and a shaft for rotating said carriers, a fast pulley and a slow pulley and means for engaging said shaft with either of said pulleys and means for automatically controlling the engagement between said shaft and either of said pulleys.

8. In a metal-working machine, a cutter and a stylus and means for carrying the same, a pattern-carrier, a die-carrier and a shaft for rotating said carriers, a fast pulley, a slow pulley, a clutch member carried by the shaft and adapted to engage either the fast pulley or the slow pulley, and means for automatically controlling the movement of said clutch member whereby the speed of the carriers may be varied.

9. In a metal-working machine, a cutter, a stylus and means for carrying the same, a pattern-carrier, a tripper carried thereby, a die-carrier, a shaft for rotating said carriers, a slow pulley normally in engagement with said shaft, a fast pulley adapted to engage said shaft, but normally disengaged therefrom, means for engaging the shaft with said fast pulley, said means being controlled by said tripper.

10. In a metal-working machine, a cutter and a stylus and means for carrying the same, a pattern-carrier, a die-carrier, and a shaft for rotating said carriers, a fast pulley and a slow pulley, a clutch member free to slide on the shaft and adapted to engage with either of said pulleys, a two-part lever in engagement with said clutch member, means for freeing one of said parts from said clutch member, and means for controlling both parts of the lever to move said clutch member into engagement with either of said pulleys.

11. In a metal-working machine, a cutter and a stylus and means for carrying the same, a pattern-carrier and a die-carrier and a shaft for rotating said carriers, a fast pulley and a slow pulley, means for connecting either of the same with said shaft, and means for blocking out the said cutter and stylus during the period when the fast pulley is in engagement with said shaft.

12. In a metal-working machine, a cutter and a stylus and means for carrying the same, a pattern-carrier and a die-carrier and a shaft for rotating said carriers, a fast pulley and a slow pulley, means for connecting either of the same with said shaft, and means for blocking out the said cutter and stylus during the period when the fast pulley is in engagement with said shaft, said means comprising a tilting latch located in the path of movement of the means for carrying said cutter and stylus.

13. In a metal-working machine, a cutter, a stylus, means for carrying the same, a pattern and a die-block, means for driving the same, means for causing the cutter and stylus to bear against and follow the design of the pattern and a controlling means for varying the speed of rotation of the pattern and die-block said controlling means comprising a swinging member, a cam controlling the same, connections between said member and the said pattern and die-block driving means, cone-pulleys, an endless belt movably mounted between said cone-pulleys and in connection with said member whereby by the position of said member the position of the belt is determined and the transmitted speed varied.

14. In a metal-working machine, a cutter and a stylus and means for carrying the same, a pattern-carrier and a die-carrier and a shaft for rotating said carriers, a fast pulley and a slow pulley and a clutch member for engaging either of the same with said shaft, a sector and means for gradually swinging said sector, a pair of cone-pulleys, one of the same being in connection with the slow pulley, a transmitting-belt between said cone-pulleys, the position of said belt being determined by said sector, a second shaft rotated by the shaft driving said carriers, a cross-head carried thereby, a cam on said sector, said cross-head being in engagement with said cam through an extension, tripper-bars carried by said pattern-carrier, and means intermediate of said tripper-bars and said clutch member for transmitting movement from the former to the latter.

15. In a metal-working machine, a cutter and a stylus and means for carrying the same, a pattern-carrier, a die-carrier, and a shaft for rotating said carriers simultaneously and at the same speed, a fast pulley, a slow pulley, and means for engaging said shaft with either of said pulleys whereby the speed of rotation of said carriers may be increased or diminished, a tripper-bar mounted on one of said carriers and controlling said means.

16. In a metal-working machine, a cutter and a stylus and a beam for carrying the same, a pattern-carrier and a die-carrier and means for rotating said carriers, a fast pulley and a slow pulley and means for transmitting power and speed of one of said pulleys or the other to the pattern and die carrier, and means for engaging with the beam to hold the cutter and stylus away from their work while the parts are being rotated by the fast pulley.

17. In a metal-working machine, a cutter and a stylus and a beam for carrying the same, a pattern-carrier and a die-carrier and means for rotating said carriers and means for abruptly accelerating or diminishing the speed of rotation of said carriers, and means for engaging the beam to hold the cutter and stylus away from their work while the rotation of the carrier is accelerated.

18. In a metal-working machine, a cutter and a stylus and means for carrying the same, a pattern-carrier and a die-block carrier and means for rotating said carriers, means for moving the cutter and the stylus-carrying means simultaneously, means for varying the working speed of rotation of the cutter and the die-carrier relatively to each other, and means for automatically increasing the speed of rotation of the pattern and die carriers said means being operative when the cutter is performing no work.

19. In a metal-working machine, a cutter and a stylus and means for carrying the same, a pattern-carrier and die-carrier and means for rotating said carriers, means for moving the cutter and stylus-carrying means simultaneously, and automatic means for abruptly increasing the speed of rotation of the die-carrier said means being operative when the cutter is performing no work.

20. In a metal-working machine, a cutter and a stylus and means for carrying the same, a pattern-carrier, a die-carrier, a shaft for rotating said carriers, means for gradually varying the speed of rotation of said shaft and other means including a shifting device for automatically and abruptly varying the speed of rotation of said shaft whereby the speed of rotation of the pattern and die carriers may be correspondingly varied either gradually or abruptly without interrupting the operation of the cutter.

21. In an engraving-machine, a plurality of oppositely-arranged rotatable cutters in axial alinement with movable means supporting said cutters, a stylus carried by said means for controlling the position thereof, said cutters working in opposite directions to simultaneously produce a force and a die.

22. In an engraving-machine, a pattern, a stylus, a universally-movable beam carrying said stylus, a cutter carried by said beam, a second universally-movable beam and a cutter carried thereby and a connection between said beams whereby motion from one beam is imparted to the other, said cutters being arranged in axial alinement and working in opposite directions to simultaneously produce a die and a force.

23. In a metal-working machine, a pattern-carrier, a plurality of cutter-carrying beams mounted on opposite sides of the machine, one end of each beam being mounted in a universal joint, the other end of each beam being supported by a suitable cross-head or the like, a cutter carried by each of said beams, and a stylus carried by one of said beams and means to cause both cutters to move in harmony with the stylus.

24. In a metal-working machine, a cutter and a stylus carried by a suitable beam, a rotatable die-carrying member and a rotatable pattern-carrying member, means to normally cause the stylus to bear against the pattern and the cutter to bear against the die-block, tripper-bars carried by the pattern-carrier, a lever controlled thereby and in turn controlling a clutch member feathered upon a shaft in turn connected with the pattern-carrier and the die-carrier, a fast and a slow pulley located in the path of movement of the clutch member and adapted to be engaged thereby, a latch for blocking out the cutter-carrying device, said latch being controlled by said tripper-bars.

25. In a machine of the character described, a rotatable pattern-carrier and a rotatable die-carrier, a stylus and cutter, a pivotally-mounted beam supporting said stylus and a cutter, curved tripper-bars carried by one of said carriers the curve of said bars being substantially concentric with the pivotal center of said beam.

26. In a machine of the character described, a pattern-carrier and a die-carrier, a stylus and a cutter, a pivotally-mounted beam supporting said stylus and cutter, adjustably-mounted tripper-bars carried by one of said carriers, the curve of said bars being substantially concentric with the pivotal center of said beam.

27. In an engraving-machine, a cutter, a stylus, and means for carrying the same, a pattern-carrier, a die-carrier, a tripping device carried by one of said carriers, a shaft for rotating said carriers, a slow pulley normally in engagement with said shaft, a fast pulley, adapted to engage said shaft but normally disengaged therefrom, means for engaging the shaft with said fast pulley, said means being controlled by said tripping device.

28. In an engraving-machine in combination, a cutter and a stylus and means for carrying the pattern and die carriers and means for rotating the carriers, automatic means for abruptly accelerating or diminishing the speed of rotation of said carriers and means to automatically and positively hold the cutter away from the block on the die-carrier during the period of accelerated rotation.

29. In an engraving-machine, a cutter and a stylus and means for carrying the same, pattern and die carriers and means for abruptly accelerating the speed of rotation of said carriers, means for positively elevating said cutter and stylus and means for blocking out the cutter to hold it away from its work during the period of accelerated rotation of said carriers.

30. In a metal-working machine, a pattern-carrier and a die-carrier, a stylus and a cutter, means for raising said stylus and cutter and means holding them to their work respectively, means for varying the speed of rotation of the pattern and die carriers, said means comprising a pair of cone-pulleys, a belt for transmitting speed from one pulley to the other, a belt-shifter and a hinged member, a cam-bar carried thereby, said cam-bar and hinged member being movable by the rotation of the pattern or die carrier, the said member being connected to said belt-shifting device through a suitable flexible medium.

31. In a machine of the character described, a rotatable pattern and die carrier, a beam pivotally mounted at one end and mounted upon antifriction-bearings at the outer end in a device whereby said outer end can be elevated or depressed, means for elevating or depressing said device controlled by the rotation of the pattern or die carrier, a cam-actuator carried by said beam-supporting device, a speed-controller, a cam constituting one of the parts of said controller and engaged by said actuator.

32. In a machine of the character described, a pattern and die carrier, a stylus and cutter, a beam supporting the same, cross-head supporting one end of said beam, a threaded shaft for elevating or depressing said cross-head, and a worm-wheel on said shaft, a shaft having an endless screw meshing with said worm-gear, a latch for holding the same in operative position, said latch being controlled by the position of said cross-head, and means to disengage said endless screw from said gear when said latch is tripped.

33. In a machine of the character described, means for carrying a pattern and a block in which a reproduction of the pattern is to be formed, a cutter, means for varying the speed of rotation of the pattern and block relatively to the speed of rotation of the cutter, said means comprising a hinged arm carrying a cam and means for bearing against the cam to swing said arm which in turn operates the variable-speed mechanism.

34. In a machine of the character described, a revoluble pattern-carrier, and a revoluble die-block carrier, and means for abruptly varying the speed of said carriers comprising a pulley and means for rotating the same, said pulley being connected by means of a pawl and ratchet with the shaft for driving said carriers, a clutch member feathered upon said shaft and means for shifting the same, a second pulley being in the line of action of said clutch member and adapted to be engaged thereby, and means for rotating said second pulley at a higher speed than said first-mentioned pulley engaging the same, and thereby increasing the speed of said shaft.

35. In an engraving-machine, pattern and die carriers, a stylus and cutter, means for carrying the same comprising a beam hinged at one end and supported at the other end by a yoke or bracket, a vertically-movable crosshead supporting said yoke and adjustable connections between said beam and yoke to vary the center height of the cutter and stylus independent of any adjustment of the crosshead.

36. In a metal-working machine, pattern and die carriers, a stylus and a cutter, means for supporting said stylus and cutter comprising a beam supported at one end so as to swing universally and supported at the other end by a vertically-moving yoke, and a blocking-out device comprising a lever one end of which is adapted to project into the path of movement of the swinging end of the beam, and means for controlling said blocking-out lever.

Signed at New Britain, Connecticut, this 5th day of November, 1901.

CHARLES B. BISHOP.

Witnesses:
   C. H. BLAIR,
   G. E. ROOT.